United States Patent [19]

Andresen

[11] 4,209,989
[45] Jul. 1, 1980

[54] SERVO MOTOR OPERATED BY A HEATABLE EXPANSIBLE SUBSTANCES

[75] Inventor: Jens N. Andresen, Sonderborg, Denmark

[73] Assignee: Danfoss A/S, Nordborg, Denmark

[21] Appl. No.: 898,099

[22] Filed: Apr. 20, 1978

[30] Foreign Application Priority Data

Apr. 20, 1977 [DE] Fed. Rep. of Germany ....... 2717467

[51] Int. Cl.² .............................................. F03G 7/06
[52] U.S. Cl. ...................................... 60/527; 60/528
[58] Field of Search ................ 60/527, 528, 530, 531; 251/11

[56] References Cited

U.S. PATENT DOCUMENTS

| | | | |
|---|---|---|---|
| 3,166,894 | 1/1965 | Zmuda | 60/527 |
| 3,500,634 | 3/1970 | Waseleski | 60/528 |
| 3,886,513 | 5/1975 | Smith | 60/530 |
| 4,016,722 | 4/1977 | Niederer | 60/527 X |
| 4,043,532 | 8/1977 | Draxler | 60/527 X |

Primary Examiner—Allen M. Ostrager
Attorney, Agent, or Firm—Wayne B. Easton

[57] ABSTRACT

The invention relates to a piston and cylinder type servomotor having an expansible substance and a heating element in the cylinder part. The cylinder part is normally movable and may be connected to a valve or the like which is adjustably movable by the unit. The unit has under and over pressure limiting switches which are located in the force transmitting path of the piston part which is the normally nonmovable part but has a small degree of movement which allows it to interact with the pressure limiting switches.

6 Claims, 7 Drawing Figures

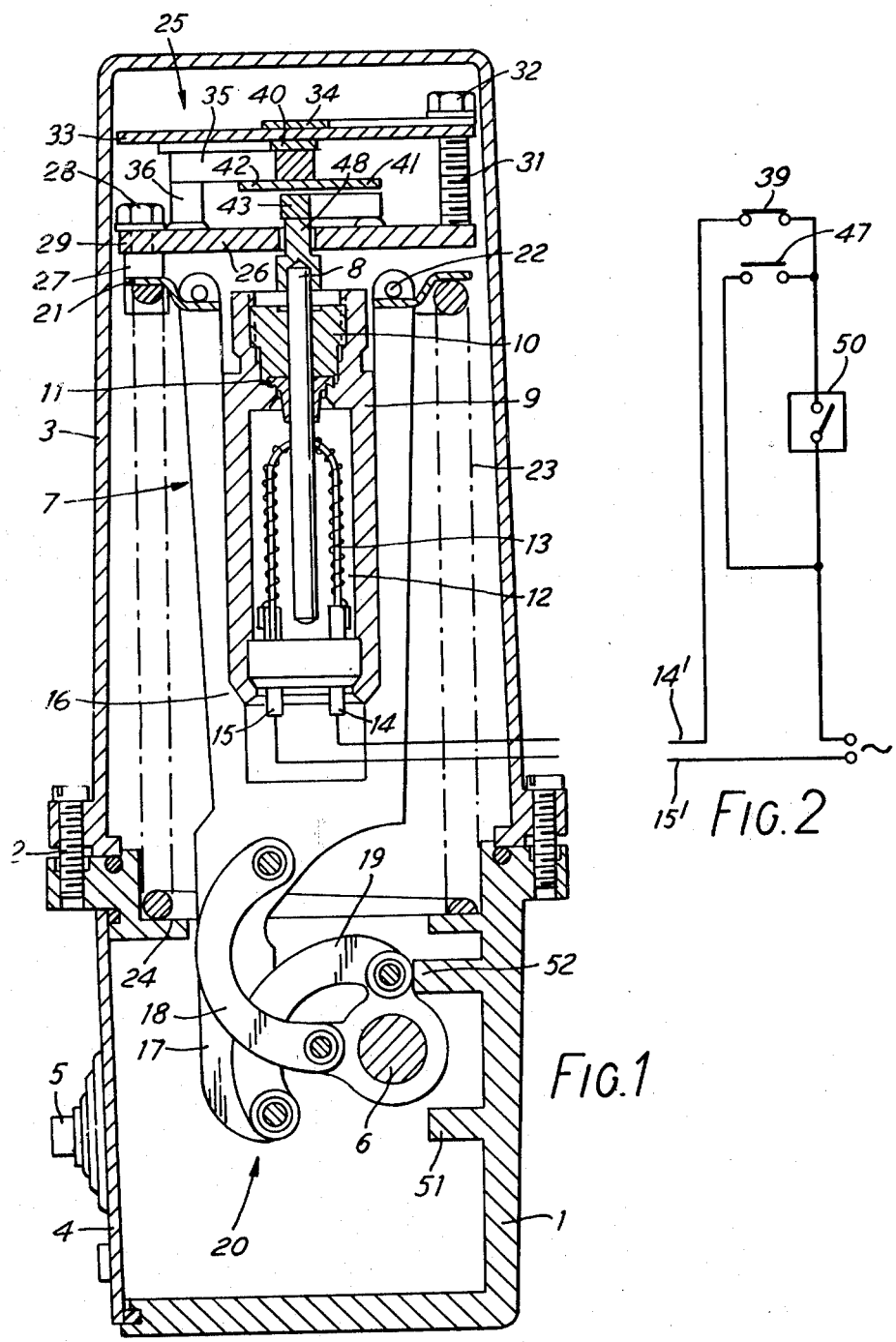

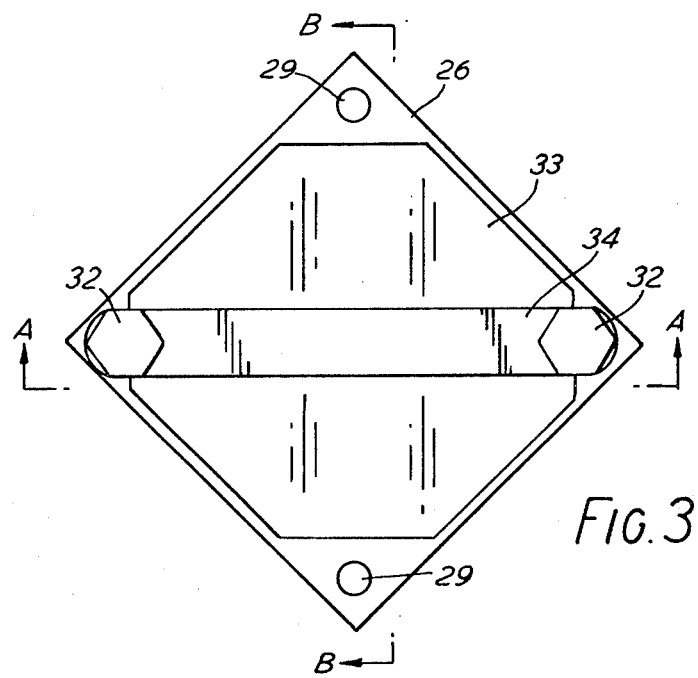
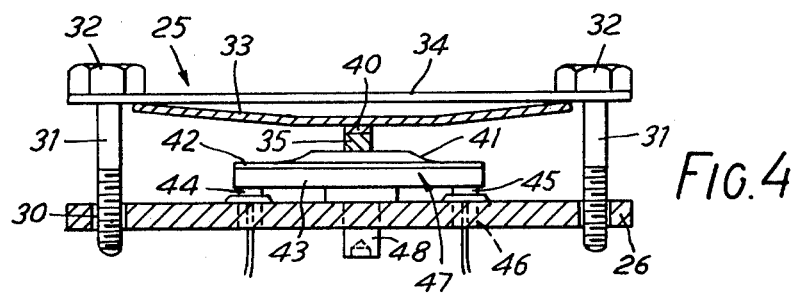
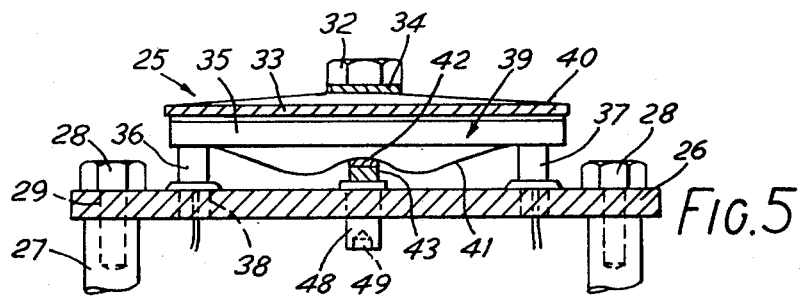

SERVO MOTOR OPERATED BY A HEATABLE EXPANSIBLE SUBSTANCES

The invention relates to a servo motor operated by a heatable expansible substance, comprising a first motor part which is at a substantially fixed location and a second motor part which, on heating, is movable relatively to the first motor part against the force of a return spring and drives an output member, and comprising a limiting switch device which has, for the outer limiting position, an overpressure spring which is disposed in the force transmitting path of the motor and is designed to be stronger than the return spring when prestressed to an extent predetermined by associated abutments, as well as an overpressure switch that opens when this prestressing is exceeded, and/or, for the inner limiting position, an underpressure spring which is disposed in the force transmitting path of the motor and is designed to be weaker than the return spring when prestressed to an extent predetermined by associated abutments, as well as an underpressure switch that closes when there is a drop below this prestressing.

In a known servo motor of this kind, there is a cylinder fixed with respect to the housing and having a piston which is movable by the expansible substance and consists of three parts connected behind one another. The underpressure spring is provided between the first piston part engaging in the cylinder and the second piston part. The overpressure spring is disposed between the second and third piston parts and the return spring engages the third piston part. To adjust the piston, a switching device is provided which provides a heater in the expansible substance with current. The overpressure switch is in series with this switching device and the underpressure switch is in parallel therewith. As a result, when the output member strikes against an abutment during its outward movement or during its inward movement, it is held in this limiting position predetermined by the abutment by means of the intermittent heating.

In the known construction there is therefore a complicated piston of comparatively large mass. The overpressure and underpressure switches must participate in the piston stroke; the necessarily movable conductors have a limited life, thereby presenting the danger that the safety function of these limiting switches is no longer ensured with certainty. Since the accessibility of the limiting switch device must be ensured, there are also constructional limitations, especially if the length is shortened.

The invention is therefore based on the problem of providing a servo motor of the aforementioned kind in which the safety function of the limiting switch device is ensured over a longer period and there is a greater freedom in constructional design.

This problem is solved according to the invention in that at least one spring of the limiting switch device is disposed in the force transmitting path between the first motor part and a support fixed with respect to the housing.

With this arrangement it is not only the second motor part which drives the output member that is movable but also the first and normally fixed motor part. However, the mobility of the first motor part is extremely small so that it can nevertheless be regarded as practically stationary. Also, movement only occurs in the two limiting positions. The operation of the servo motor is therefore not impeded. Since the limiting switch device is disposed between a support that is fixed with respect to the housing and the practically stationary first motor part, the contacts of the overpressure and underpressure switches are also practically stationary. They can therefore be connected to substantially fixed conductors so that the safety function is ensured over a prolonged period. The limiting switch device may be arranged at one end of the servo motor and is therefore readily accessible. A greater freedom in the design of the servo motor is obtained because the construction of the limiting switch device and that of the servo motor are substantially independent from each other.

A particularly short constructional length is obtained if the return spring in the form of a helical spring surrounds the motor parts over a considerable part of their length. This construction is possible because the limiting switch device is disposed axially beyond the motor parts.

Another possibility of reducing the constructional length which may also be used together with the aforementioned possibility resides in that at least one spring of the limiting switch device is in the form of a plate spring. In comparison with a helical spring, this brings about considerable shortening, particularly with regard to the overpressure spring which must be comparatively strong.

In a preferred embodiment, provision is made for the overpressure switch to comprise a stiff beam and two contacts which are fixed with respect to the housing and can be electrically connected by the beam, and for the overpressure spring to be supported on the one hand by a counterbearing fixed with respect to the housing and on the other hand by said beam, the contacts serving as the associated limiting abutments for the beam. In this case the contacts are not only substantially stationary but completely fixed with respect to the housing. There is no mechanical load whatsoever acting on the leads. Since the contacts simultaneously serve as limiting abutments, one also obtains a simple and compact construction.

In a further development of the invention, the underpressure switch comprises a stiff beam and two contacts which are fixed with respect to the housing and can be electrically connected by the beam, and the underpressure spring is supported on the one hand by a counterbearing and on the other hand by said beam, the counterbearing and associated limiting abutments for the beam being held fixed with respect to the housing at least during normal operation. Again, there is here no mechanical load on the leads. Further, the limiting abutments fixed with respect to the housing provide a simple construction.

In particular, the stiff beam of the underpressure switch may be disposed with the underpressure spring between the first motor part and the stiff beam of the overpressure switch. The beam of the overpressure switch here serves as limiting abutment for the beam of the underpressure switch. A very shallow constructional height is obtained particularly when using plate springs.

Preferably, a bowed plate spring should serve as the underpressure spring. It reaches the predetermined prestressing when it has been fully applied to the beam of the overpressure switch.

Desirably, the stiff beams of the overpressure and underpressure switches intersect at an angle, particularly 90°. The associated contacts then have a comparatively large spacing from one another, which simplifies insulation.

With particular advantage, the contacts and/or the stiff beams are of nickel-plated steel. This takes into account the fact that the contacts and beams are subjected to relatively large forces during operation. The nickel coating provides a low contact resistance.

Further, an insulating layer may be provided between the stiff beams and the overpressure and underpressure springs. More extensive insulating precautions are generally not necessary. Relatively large forces can also be transmitted by way of the insulating layers.

In a preferred construction, the contacts are insulatingly secured to a base plate through the centre of which there passes a pressure shoe movable with the first motor part, and carry at each of opposite sides a screw as a counterbearing for the plate-shaped overpressure spring. This provides an assembly unit for the limiting switch device because all the important parts extend between the base plate and the heads of the counterbearing screws.

In order that the counterbearing screws will not be laterally deflected, it is recommended that they be interconnected by a clamping clip.

Further, the base plate may, by means of two supports extending an opposite sides adjacent the servo motor, be held to a housing part which has a counterbearing for the return spring. Together with the return spring, the servo motor can then be assembled with the housing part, whereupon the limiting switch device is placed thereon as an assembly unit and holds all the components in the operative position by means of the rod pins.

The invention will now be described in more detail with reference to an example illustrated in the drawing, wherein:

FIG. 1 is a longitudinal section through a servo motor according to the invention;

FIG. 2 is a diagrammatic circuit diagram;

FIG. 3 is a plan view of the limiting switch device turned through 45° with respect to FIG. 1;

FIG. 4 is a section of the limiting switch device on the line A—A in FIG. 3; and FIG. 5 is a section through the limiting switch device on the line B—B in FIG. 3.

Figure 6:
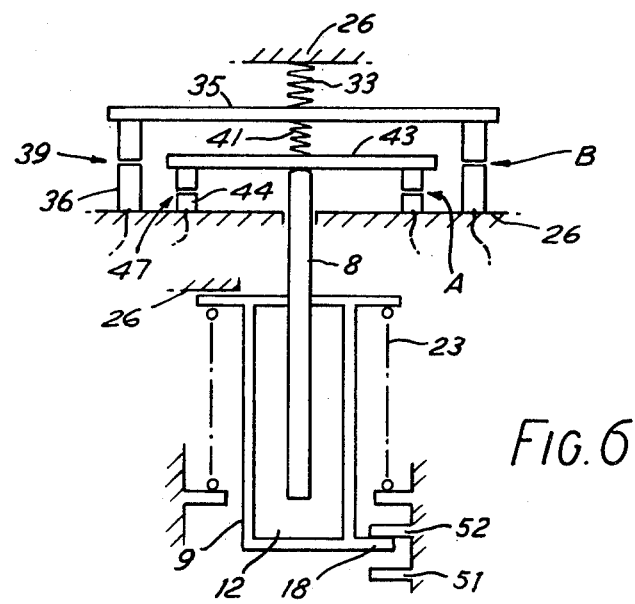
FIG. 6 is a sketch which schematically shows the essential elements of the embodiment of the invention shown in FIGS. 1 to 5.

A housing consists of a lower part 1 and an upper part 3 connected thereto by screws 2. The lower part has a removable side wall 4 in the form of an electric terminal plate provided with a passage 5. Mounted in the lower part 1 there is an output member 6 in the form of a shaft which serves to connect a servo member, for example a throttle valve in an air supply passage.

A servo motor 7 has a first motor part 8 in the form of a piston and a second motor part 9 in the form of a cylinder. This cylinder is closed by a cover 10 which holds a seal 11. The interior 12 is filled with expansible substance which can be heated by means of an electric heating resistor 13. It is energized by way of two terminals 14 and 15.

A socket 16 receives the second motor part with a push fit. It possesses an extension 17 to which two coupling elements 18 and 19 of cross-linkage 20 are hinged, the other end of the linkage being pivoted to the output member 6. The upper end of the socket 16 extends through recesses in a spring supporting plate 21 and is there secured by means of pins 22. Engaging this spring supporting plate there is a return spring 23 of which the lower end is supported on a counterbearing surface 24 of the lower part of the housing.

Above the servo motor 7 there is a limiting switch device 25 which is assembled as a unit with the aid of a base plate 26. The base plate is held at a predetermined elevation by means of supports 27. Engaged in the supports from the top there are two screws 28 which pass through holes 29 of the base plate 26 arranged at opposite corners. The lower ends of the supports 27 can be secured to the lower part 1 of the housing in any desired manner. The spring supporting plate 21 is guided on these supports.

Two screws 31 are screwed into two tapped holes 30 arranged at the two remaining corners of the base plate 26. The head 32 of the two screws serves as a counterbearing for an overpressure spring 33 in the form of a bowed plate. The two screws 31 are interconnected by means of a clamping yoke 34. The overpressure spring 33 presses a stiff beam 35 against two contacts 36 and 37 of nickel-plated steel which, by means of a glass bush 38, are insulatingly held in the plate 26 fixed with respect to the housing. These conacts 36 and 37 simultaneously serve as limiting abutments which determine the prestressing of the overpressure spring 33. The prestressing is selected so that it is larger than the pressure of the return spring 23. The beam 35 and the contacts 36 and 37 form an overpressure switch 39. For insulating purposes, an insulating layer 40, for example of mica, is interposed between the beams 35 and the overpressure spring 33.

An underpressure spring 41 supported against the beam 35 likewise has the shape of a bowed plate spring. With the interpositioning of an insulating 42 such as of mica, it acts on a stiff beam 43 lying against the contacts 44 and 45 which are likewise held in the base plate 26 to be fixed with respect to the housing by means of a glass bush 46. These parts form an underpressure switch 47. The first motor part 8 engages in the lower recess 49 of a pressure shoe 48 acting on the beam 43. The underpressure spring 41 is dimensioned so that it is normally pressed under the influence of the return spring 23 against the upper beam 35 acting as a limiting abutment, i.e. it assumes the illustrated position only when the force of the return spring 23 has been overcome.

By way of example it may be mentioned that the return spring 23 in the illustrated upper limiting position produces a force of about 80 kp and in the lower limiting position of about 100 kp. The underpressure spring responds when a force of 20 kp is exceeded and the overpressure spring responds when a force of 150 kp is exceeded.

FIG. 2 shows the circuit diagram for the heating resistor 13. Current from an AC mains supply passes through a switch device 50, the overpressure switch 39, leads 14' and 15', and terminals 14 and 15, to the heating resistor 13. This causes the expansible substance to be heated. It then expands. The second motor part 9 is displaced downwardly. When an outer limiting position has been reduced, e.g. when a valve is seated on its seating or when the coupling element 18 lies against an abutment 51, the force with which the first motor part 8 lies against the counterbearing screws 31 rises. When the prestressing is exceeded, the overpressure switch 39 opens, the expansible substance cools off and the second motor part 9 is pulled back again until the overpressure switch 39 closes. There is therefore intermittent heating which holds the servo motor in the outer limiting position without excessive forces being produced.

If the switch device 50 allows no current to pass, the expansible substance cools off until the second motor part 9 has reached the inner limiting position which is for example determined by abutment of the coupling element 19 against an abutment 52. The return spring 23 thereby becomes inoperative. The underpressure switch 47 closes. Heating takes place which again pushes the second motor part 9 outwardly until the underpressure switch 47 again opens. There is thus intermittent heating by which the servomotor is held in the inner limiting position.

For servicing purposes it is merely necessary to remove the upper housing part 3. The limiting switch device 25 can then be removed as a whole by loosening the screws 28 and either repaired or replaced.

The above description of an embodiment of the invention sufficiently describes the invention from the standpoint of accuracy and completeness. As a further aid to an understanding of the invention FIG. 6 is in the form of a sketch which shows the essential elements schematically to make the construction and operation more readily understood. The sketch is based entirely on the above description, however, and documentation for all parts of the sketch may be found in the above description.

A feature or object of the invention referred to in the introduction hereof is that at least one of the springs 33 or 41 of one of the switches 39 or 47 is in the force transmitting path between the first motor part 8 and a fixed support 26. This is shown in FIGS. 4 and 5 of the drawing and is clearly emphasized in the sketch of FIG. 6.

Also in the introduction hereof it is stated that the normally fixed or immoveable motor part 8 has only a small amount of movement (extremely small) which occurs only in the two limiting positions of the other motor part 9.

Referring to the sketch of FIG. 6, switch 47 opens when (with cylinder 8 in the first limiting position shown) piston part 8 lifts beam 43 a few thousanths of an inch (represented for convenience as gap A) off the fixed contacts 44. Spring 41 is weaker than spring 33 so it is only beam 43 rather than beam 35 that is moved when cylinder 9 is in the first limiting position. Likewise, spring 41 is weaker than return spring 23 so the beam 43 is moved out of contact with the contacts 44 before cylinder 9 moves away from its first limiting position.

When cylinder 9 moves to the second limiting position where it is stopped by the abutment 51 a further increase in the pressure of the substance 12 causes the second stage of minute movement for the piston 8 so that beam 43 is caused to lift beam 35 off of the contacts 36 a few thousandths of an inch as indicated by the gap B to open switch 39.

Figure 7:
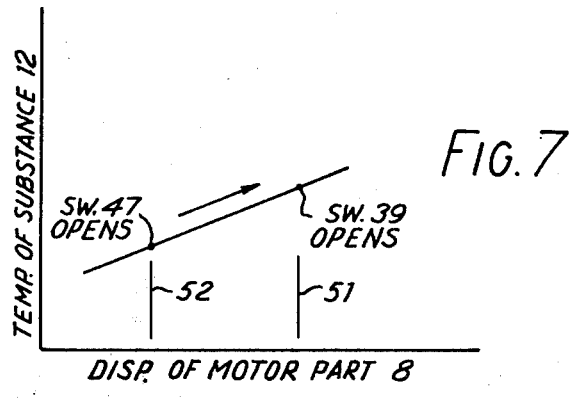
FIG. 7 is a graph which illustrates operation of the invention as a function of temperature.

As the piston 8 is in theory of operation only supposed to have the minute movements at the two limiting stages controlled by abutments 51 and 52 it is not feasible to show that range of movement in the drawings. FIG. 7 is a graph which illustrates the two limiting positions for the cylinder 9 and the respective concomitant opening of the switches 47 and 39 as a function of the temperature of the substance 12.

After cylinder part 18 engages abutment 51 of the continuing increasing of the temperature and pressure of the substance 12 forces piston 8 upwardly into biasing contact with beam 43 which in turn biases beam 35 which is thereby lifted off the contacts 36. Prior to the movement of cylinder part 18 away from abutment 52, beam 43 was lifted by piston 8 away from contacts 44 and into biasing engagement with beam 35 as referred to above.

When cylinder part 18 engages abutment 52 as a result of the cooling and contracting of the substance 12 the spring 41 pushes the beam 43 into contact with the contacts 44. As the substance 12 contracts, there is nothing to prevent spring 41 from biasing piston 8 through the beam 43 to take up the slack which results from the contracting of the substance 12.

I claim:

1. A servomotor assembly, comprising, a housing, first and second piston and cylinder motor parts with an expansible substance and a heating element in said cylinder part, abutment means providing limiting higher and lower pressure positions for said cylinder corresponding to predetermined higher and lower pressures of said substance, said substance exerting an over pressure higher than said predetermined pressure when subjected to continued heating at said higher pressure position, said substance exerting an under pressure lower than said predetermined lower pressure when subjected to continued cooling at said lower pressure position, a return spring cooperable with said cylinder motor part, over pressure and under pressure limiting switch means operable by said position motor part, over pressure and under pressure spring means for said switch means which are respectively stronger and weaker than said return spring and respectively oppose and assist the movement of said second motor part, at least one of said springs being in the force transmitting path of said piston motor part.

2. A servomotor assembly according to claim 1 wherein said over pressure switch means includes a stiff beam and two contacts which are fixed with respect to said housing and which can be electrically connected by said beam.

3. A servomotor assembly according to claim 1 wherein said under pressure switch means includes a rigid beam and two contacts which are fixed with respect to said housing and which can be electrically connected by said rigid beam.

4. A servomotor assembly according to claim 3 wherein said rigid beam of said under pressure switch is disposed with said under pressure spring means between said piston motor part and said stiff beam of said over pressure switch means.

5. A servomotor assembly according to claim 4 wherein said under pressure spring means is a bowed plate spring.

6. A servomotor assembly according to claim 1 wherein said over pressure and under pressure switch means intersect at an angle.

* * * * *